United States Patent
Buch et al.

(10) Patent No.: US 10,629,238 B1
(45) Date of Patent: Apr. 21, 2020

(54) MANAGING STORAGE DEVICE MEDIA DATA RATES

(71) Applicant: Seagate Technology LLC, Cupertino, CA (US)

(72) Inventors: Bruce Buch, Westborough, MA (US); Xiong Liu, Singapore (SG); Kenneth Haapala, Plymouth, MN (US); Brian T. Edgar, Minneapolis, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 16/289,762

(22) Filed: Mar. 1, 2019

(51) Int. Cl.
*G11B 27/36* (2006.01)
*G11B 15/02* (2006.01)
*G11B 21/02* (2006.01)
*G06F 12/10* (2016.01)

(52) U.S. Cl.
CPC .............. *G11B 21/02* (2013.01); *G06F 12/10* (2013.01); *G06F 2212/657* (2013.01)

(58) Field of Classification Search
CPC ........... G11B 27/30; G11B 5/00; G11B 27/36; G11B 20/10009; G11B 5/09; G11B 20/12; G11B 5/59633; G11B 5/5534; G11B 5/5543; G11B 20/10; G11B 5/0275; G11B 19/02; G11B 15/02
USPC ... 360/18, 22, 25, 31, 39, 51, 48, 49, 78.07, 360/78.14, 75, 58
See application file for complete search history.

(56) References Cited

U.S. PATENT DOCUMENTS

| | | | | |
|---|---|---|---|---|
| 4,945,427 | A | * | 7/1990 | Cunningham ......... G11B 5/012 360/235.4 |
| 5,293,282 | A | | 3/1994 | Squires et al. |
| 5,343,347 | A | | 8/1994 | Gilovich |
| 5,724,539 | A | | 3/1998 | Riggle et al. |
| 5,892,633 | A | * | 4/1999 | Ayres .................... G06F 3/0601 360/39 |
| 6,327,638 | B1 | | 12/2001 | Kirby |

(Continued)

OTHER PUBLICATIONS

Boettcher, Uwe et al., "Modeling and Control of a Dual Stage Actuator Hard Disk Drive", Journal of Advanced Mechanical Design, Systems, and Manufacturing, vol. 4, No. 1, 2010, Copyright © 2010 by JSME, 12 pages.

(Continued)

*Primary Examiner* — Nabil Z Hindi
(74) *Attorney, Agent, or Firm* — Westman, Champlin & Koehler, P.A.

(57) ABSTRACT

An apparatus includes a logical space and first and second physical spaces. The apparatus further includes a map in which first successive alternate logical elements of the logical space are mapped to successive adjacent physical elements of the first physical space, and second successive alternate logical elements of the logical space are mapped to successive adjacent physical elements of the second physical space. A control circuit employs the map to substantially concurrently manage storage of data extents into the first and second physical space by routing a first subset of the data extents into the first physical space, routing a second subset of the data extents into the second physical space, and splitting individual extents of a third subset of the data extents into sub-portions, with at least one of the sub-portions being routed to the first physical space and another sub-portion being routed to the second physical space.

19 Claims, 9 Drawing Sheets

(56) References Cited

U.S. PATENT DOCUMENTS

| | | | |
|---|---|---|---|
| 6,487,633 | B1 | 11/2002 | Horst et al. |
| 6,658,201 | B1 * | 12/2003 | Rebalski ............... G11B 5/012 |
| | | | 369/124.09 |
| 7,102,842 | B1 | 9/2006 | Howard |
| 7,196,862 | B1 * | 3/2007 | Adams ............... G11B 5/59688 |
| | | | 360/51 |
| 7,385,781 | B1 | 6/2008 | Craig et al. |
| 7,760,463 | B2 * | 7/2010 | Ward ................... G11B 21/025 |
| | | | 360/78.12 |
| 8,134,798 | B1 * | 3/2012 | Thelin ............... G11B 20/1258 |
| | | | 360/39 |
| 9,002,795 | B2 | 4/2015 | Messinger et al. |
| 9,459,802 | B1 * | 10/2016 | Budiman ............. G06F 3/0619 |
| 2018/0174613 | A1 | 6/2018 | Zhu et al. |

OTHER PUBLICATIONS

Nie, Jianbin, "Control Design and Implementation of Hard Disk Drive Servos", A dissertation submitted in partial satisfaction of the requirements for the degree of Doctor of Philosophy in Engineering-Mechanical Engineering in the Graduate Division of the University of California, Berkeley, Spring 2011, 109 pages.

\* cited by examiner

MANAGING STORAGE DEVICE MEDIA DATA RATES

SUMMARY

In one embodiment, an apparatus includes a logical space having a plurality of logical elements. The apparatus also includes a first physical space having a first plurality of physical elements, and a second physical space having a second plurality of physical elements. The apparatus further includes a map in which first successive alternate logical elements of the plurality of logical elements are mapped to successive adjacent physical elements of the first plurality of physical elements, and second successive alternate logical elements of the plurality of logical elements are mapped to successive adjacent physical elements of the second plurality of physical elements. A control circuit employs the map to substantially concurrently manage storage of a plurality of data extents into the first physical space and into the second physical space by routing a first subset of the plurality of data extents into the first physical space, routing a second subset of the plurality of data extents into the second physical space, and splitting individual extents of a third subset of the plurality of data extents into sub-portions, with at least one of the sub-portions being routed to the first physical space and another one of the sub-portions being routed to the second physical space.

In another embodiment, an apparatus includes a first logical space having a first plurality of logical elements, a second logical space having a second plurality of logical elements, and a third logical space having a third plurality of logical elements. The apparatus also includes a first physical space having a first plurality of physical elements and a second physical space having a second plurality of physical elements. The apparatus further includes a map in which first successive alternate logical elements of the first plurality of logical elements are mapped to successive adjacent logical elements of the second plurality of logical elements, and second successive alternate logical elements of the first plurality of logical elements are mapped to successive adjacent logical elements of the third plurality of logical elements. A control circuit dynamically assigns different ones of the first plurality of physical elements to different ones of the second plurality of logical elements, and dynamically assigns different ones of the second plurality of physical elements to different ones of the third plurality of logical elements. The control circuit also employs the map along with the dynamic assignment to substantially concurrently manage storage of a plurality of data extents into the first physical space and into the second physical space.

In yet another embodiment, a data storage device includes first and second data storage surfaces. The data storage device also includes a dual actuator comprising a first head that communicates with the first data storage surface and a second head that communicates with the second data storage surface. The data storage device further includes a controller that is communicatively coupled to the first and second heads. The controller transfers data from a buffer memory to the first and second data storages surfaces by the first and second heads at a substantially constant data rate across a logical block address space of the apparatus.

This summary is not intended to describe each disclosed embodiment or every implementation of managing storage device media data rates as described herein. Many other novel advantages, features, and relationships will become apparent as this description proceeds. The figures and the description that follow more particularly exemplify illustrative embodiments.

DETAILED DESCRIPTION OF ILLUSTRATIVE EMBODIMENTS

Embodiments of the disclosure relate to managing media data rates in data storage devices.

One example of a data storage device is a disc drive that includes one or more discs on which data are written on tracks between an inner diameter (ID) and an outer diameter (OD) of each disc. A conventional disc drive provides its highest data rate at OD tracks and its slowest date rate at tracks near the ID, which may be roughly half the OD track rate. A disc drive may employ a logical-physical map in which the OD tracks are mapped to low logical block addresses (LBAs) and the ID tracks are mapped to high LBAs.

When a disc drive is employed in a surveillance system, for example, a typical workload for the surveillance system drive may include streams of write data from several sources (e.g., cameras), each of a nearly constant data rate. The minimum data rate of a drive determines the number of video sources it can support, thus its cost effectiveness to the overall surveillance system. The data rate that a conventional drive can guarantee is its worst case (lowest) media data rate when its heads are positioned near the ID. Further, the logical-physical mapping scheme in which the OD tracks are mapped to low LBAs and the ID tracks are mapped to high LBAs may provide different data rates in different portions of the logical space.

Embodiments of the disclosure relate to managing media data rates in data storage devices such that a substantially constant data rate (or roughly constant data rate) across an entire logical space of the device may be provided. Different embodiments are described in connection with FIGS. 1A-8.

It should be noted that the same reference numerals are used in different figures for same or similar elements. It should also be understood that the terminology used herein is for the purpose of describing embodiments, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," "intermediate" and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

Figures 1A, 1B:
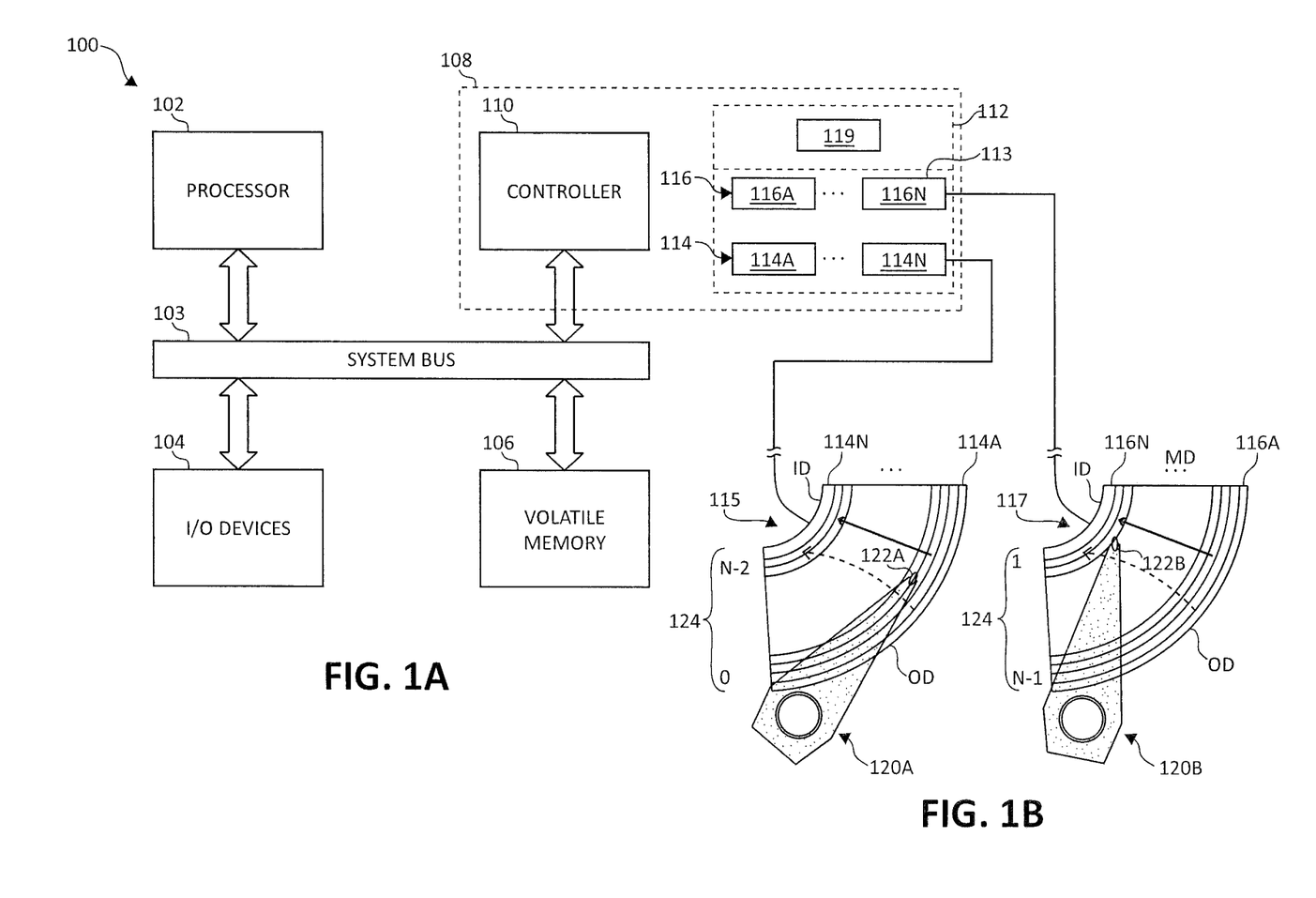
FIG. 1A is a simplified block diagram of an illustrative embodiment of a system of data storage management.
FIG. 1B shows representative discs of a disc drive on which embodiments of the present disclosure may be practiced.
Figure 1C:
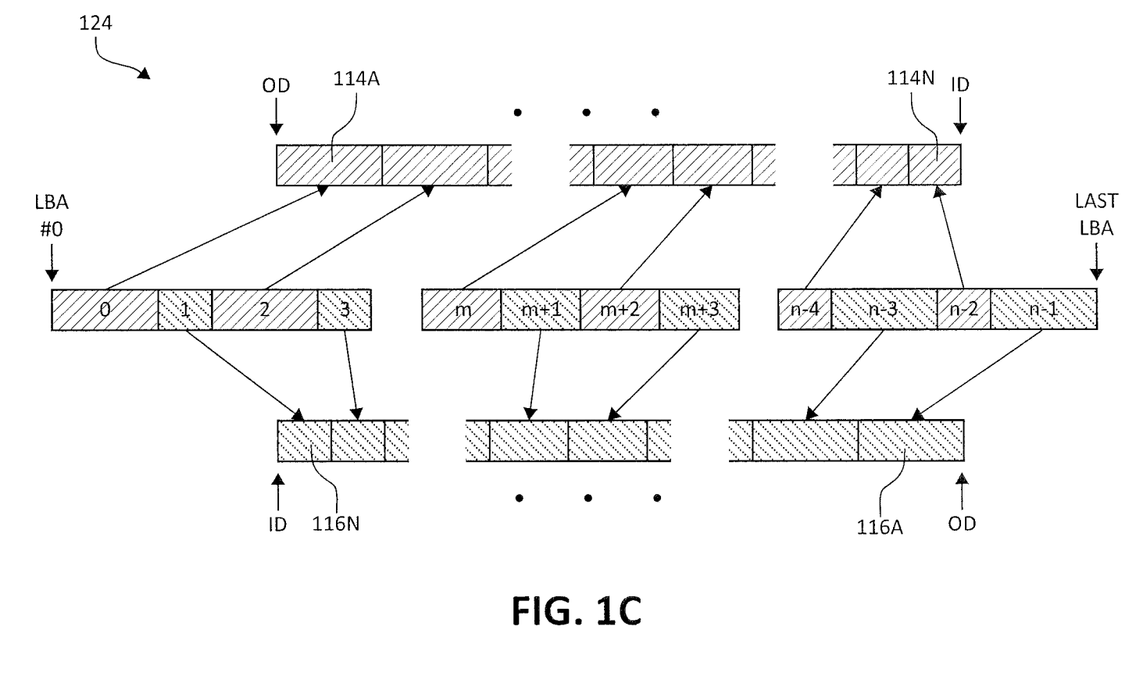
FIG. 1C is a diagrammatic illustration showing logical-physical mapping in accordance with one embodiment.

Referring to FIG. 1A, a particular embodiment of a system of data storage management is shown and generally designated 100. The system of data storage management 100 may include a processor 102 connected to a system bus 103 which also can be connected to input/output (I/O) devices 104, such as a keyboard, monitor, modem, storage device, or pointing device. The system bus 103 may also be coupled to a memory 106, which may be a random access volatile memory. The system bus may additionally be coupled to a data storage device 108.

The data storage device 108 may include a controller 110, which may be coupled to the processor 102 via a connection through the system bus 103. In one embodiment, the data storage device 108 comprises at least one storage entity 112. In a particular embodiment, storage entity 112 includes one or memories or data storage media. As shown in FIG. 1A, storage entity 112 is further organized as a main store 113, such as one or more platters or discs of a disk drive as shown in FIG. 1B. The main store 113 may include a first plurality of physical elements 114 (e.g., a first plurality of physical tracks or bands 114A-114N on a first disc surface 115 shown in FIG. 1B) and a second plurality of physical elements 116 (e.g., a second plurality of tracks or bands 116A-116N on a second disc surface 117 shown in FIG. 1B). A suitable logical-physical map 119 is included to help provide a substantially constant data rate across an entire logical space of the device. An embodiment that employs complementary dual actuators and a complementary logical-physical mapping scheme is described below in connection with FIG. 1B.

In the embodiment of FIG. 1B, the disc drive employs complementary dual actuators 120A and 120B that include heads 122A and 122B, respectively. Heads 122A and 122B communicate with disc surfaces 115 and 117, respectively. Disc surfaces 115 and 117 are shown in this embodiment as separate discs for convenience, disc surfaces 115 and 117 may be two sides of the same disc or surfaces of two separate discs. As can be seen in FIG. 1B, segments 124 of the logical space or LBA space are interleaved between first tracks or bands 114A-114N on first disc surface 115 served by first actuator 120A that moves OD to ID as LBAs increase, and second tracks or bands 116A-116N on second disc surface 117 served by second actuator 120B moving from ID to OD. The combined data rate is the sum of rates at tracks equidistant but at opposite offsets from a middle diameter (MD). This combination of a "fast" track or band and a "slow" track or band, or two medium-rate tracks or bands, when smoothed by buffering, results in a substantially constant aggregate data rate presented to a host. In this embodiment, a complementary logical-physical mapping scheme may be employed in which successive even logical elements (e.g., logical tracks or bands 0, 2, 4, etc.) are mapped to successive adjacent physical elements (e.g., physical tracks or bands 0, 1, 2, etc.) on the first disc surface 115, and successive odd logical elements (e.g., logical tracks or bands 1, 3, 5, etc.) are mapped to, for example, successive adjacent physical tracks or bands on the second disc surface 117. Mapping of logical elements 124 to physical elements 114A-114N and 116A-116N on disc surfaces 114 and 117, respectively, for an LBA space is diagrammatically illustrated in FIG. 1C. In an alternate embodiment, which is described further below, host management may be enlisted to distribute its workload across surfaces served by dual actuators driven to complementary positions.

During operation, the processor 102 may send commands and data to the data storage device 108 to retrieve or store data. The controller 110 can receive the commands and data from the processor 102 and then manage the execution of the commands to store or retrieve data from storage entity 112, using map 119. It should be noted that controller 110 may include one or more integrated circuits. In one embodiment, controller 110 is a dual-channel controller and each of actuators 120A and 120B is associated with a different channel. In such an embodiment, during a sequential write operation, data is flushed from a buffer with concurrent writes to logically adjacent elements. Examples of logically adjacent elements include even-odd logical track or logical band pairs, adjacent logical sectors, adjacent logical block address ranges, etc. In one embodiment, a size of a logical block address range may be 10 megabytes. The capacities of the logically adjacent elements (e.g., even-odd logical track or band pairs) vary across the stroke, but the combined capacity of a pair written in a single disc revolution or other short time span is roughly constant. As described above in connection with FIGS. 1B and 1C, in such an embodiment, even elements of logical block space are on a conventionally mapped OD-to-ID surface, and the odd counterparts are on an oppositely-mapped ID-to-OD surface.

A drive of the type described above in connection with FIGS. 1A, 1B and 1C can provide a guaranteed sequential data rate that is nearly constant across the entire LBA space and exceeds the guaranteed rate the same drive could provide with both actuators using conventional mapping, wherein both actuators are on slower ID tracks when positioned for a high LBA space.

Figure 2:
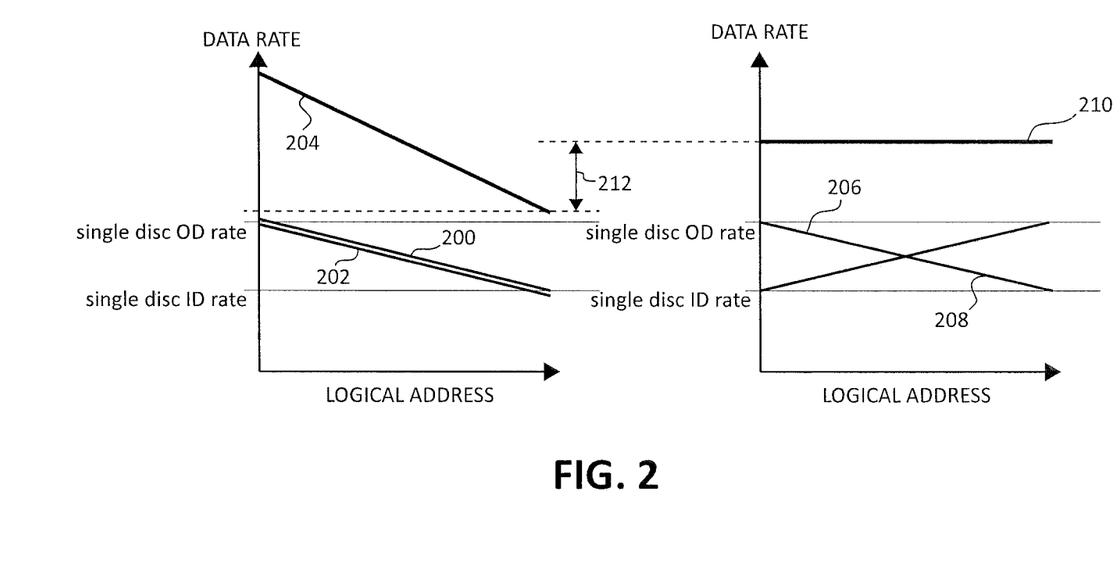
FIG. 2 includes graphs showing data rate profiles for dual-actuator drives with conventionally-mapped and complementary-mapped surfaces.

Data rate profiles for dual-actuator drives with conventionally-mapped and complementary-mapped surfaces are illustrated in FIG. 2. Plots 200 and 202 on the left side in FIG. 2 represent data rate profiles from two conventionally mapped surfaces in a dual-actuator drive. Plot 204 (also on the left side of FIG. 2) shows an aggregate data rate for the drive, which is just the sum of the two data rates for the conventionally mapped surfaces. The guaranteed minimum rate is the ID-limited sum at the high end of the LBA space.

The right side of FIG. 2 shows plots of results obtained for a dual-actuator, dual-channel drive that interleaves data at track or band granularity between one surface mapped OD-to-ID (plot 206) and another mapped ID-to-OD (plot 208). A sum of the two actuator data rates yields an aggregate rate (plot 210) nearly constant across the LBA space, and is roughly the sum of the single-track OD and ID rates. An arrow 212 between aggregate rate plots 204 and 210 shows the increase in guaranteed rate with complementary mapping. If the OD data rate is about twice the ID data rate, then the guaranteed media data rate for a conventionally-mapped dual-actuator drive is about twice the ID data rate, and is about three times the ID data rate for the complementary-mapped drive.

It should be noted that, in addition to the above-described dual-channel drive with dual-read/write capability, embodiments of the disclosure are also applicable to a drive with dual-actuator mechanics but having only a single-channel system on a chip (SOC). For such a drive, data is also flushed from a buffer to, for example, an even-odd track or band pair, with a nearly constant media rate that is the average of the even and odd track bandwidth (BW) rather than their sum.

Figure 3:
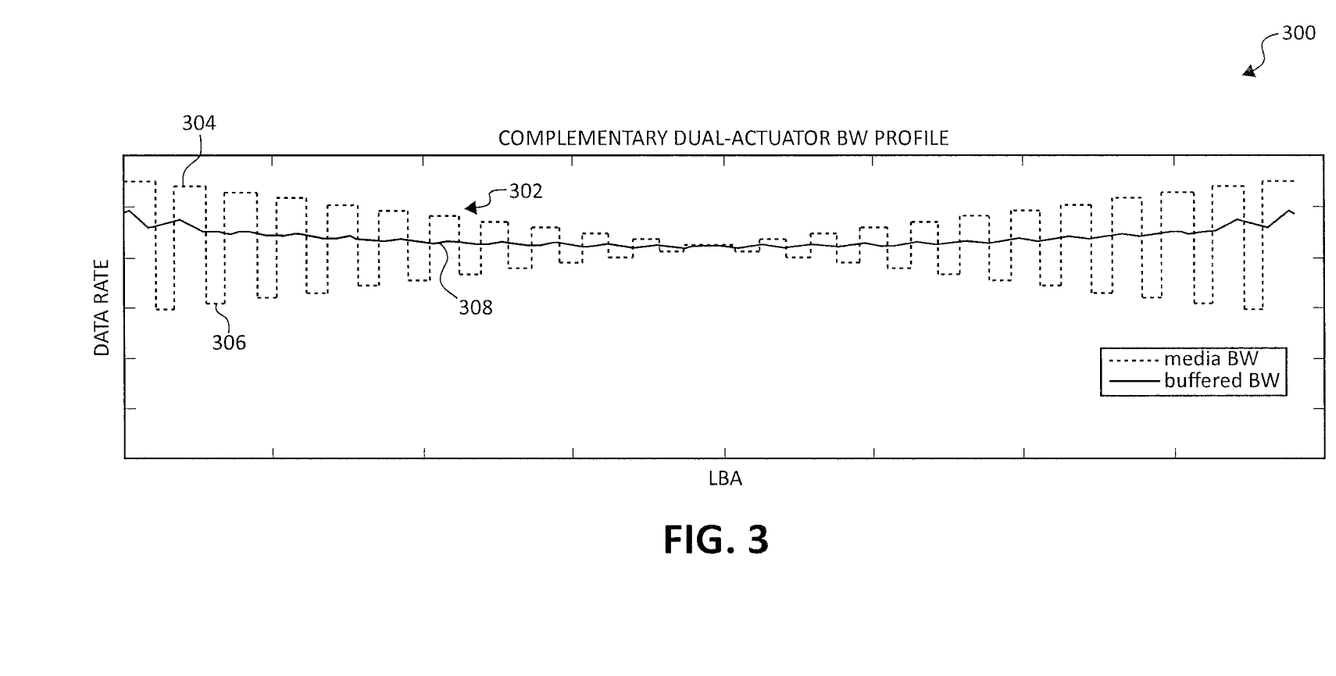
FIG. 3 is a graph illustrating a bandwidth versus logical block address profile for a single-channel drive with complementary-mapped surfaces.

FIG. 3 is a graph illustrating a BW versus LBA profile 300 for a single-channel drive with complementary mapped surfaces. The instantaneous BW of the transfer from buffer to the media is shown by plot 302, alternating between high 304 and low 306 BW at the extreme diameters. The moving average of the BW, corresponding to the buffered BW, is shown by plot 308, and can be observed to be roughly constant across the whole stroke of LBA space.

Figure 4:
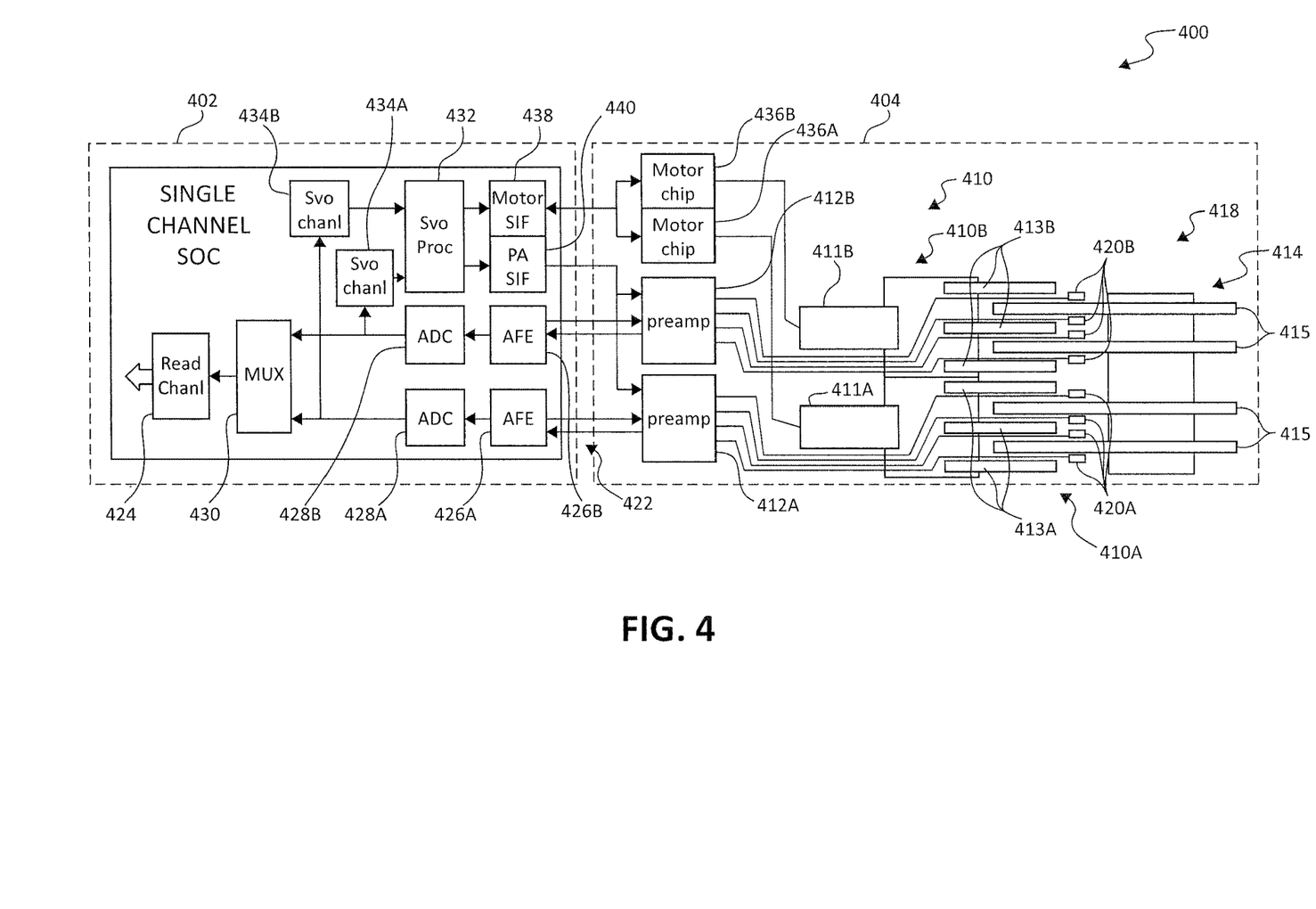
FIG. 4 is a block diagram including example electronics for a dual-actuator, single-channel drive in accordance with one embodiment.

FIG. 4 is a block diagram including example electronics for a dual-actuator, single-channel drive 400 in accordance with one embodiment. Drive 400 includes electronics 402 and a head-disc assembly (HDA) 404. Electronics 402, which may be incorporated into a single SOC, include circuitry and processors that form a part of a target interface controller (or drive controller) for communicating between a host system (not shown) and HDA 404. The host system can include a microprocessor-based data processing system such as a personal computer or other system capable of performing a sequence of logical operations. Data is transmitted between the host system and electronics 402 via a host bus connector and other circuitry, which are not shown in the interest of simplification. HDA 404 includes a dual actuator assembly 410 having individual actuator sub-assemblies 410A and 410B, a first preamplifier circuit 412A connected to the first actuator sub-assembly 410A, a second preamplifier circuit 412B connected to the second actuator sub-assembly 410B, and a disc assembly 414. Disc assembly 414 includes one or more media discs 415, stacked on a spindle assembly 418. Spindle assembly 418 is mechanically coupled to a spindle motor (not shown) for rotating the disc(s) at a high rate of speed. First and second sub-assemblies 410A and 410B are show in FIG. 4 with a substantially common pivot point, but in some embodiments first and second sub-assemblies 410A and 410B may have separate pivot points. First and second sub-assemblies 410A and 410B are show in FIG. 4 in a stacked configuration with 410B on top of 410A, but in some embodiments first and second sub-assemblies 410A and 410B may be interlaced with each other such that multiple actuator arms 413 are alternatively part of first sub-assembly 410A and second sub-assembly 410B.

First actuator sub-assembly 410A includes a first voice coil motor (VCM) 411A, and first multiple actuator arms 413A. Second actuator sub-assembly 410B includes a second VCM 411B, and second multiple actuator arms 413B. Located at the end of each one of actuator arms 413A and 413B are one or more sliders/transducer heads such as 420A and 420B, which are associated with a respective disc surface. Transducer heads 420A and 420B communicate with electronics 402 via a cable assembly 422 connected to preamplifiers 412A and 412B for reading and writing data to the transducer head's associated disc surface. Analog front end (AFE) circuits 426A and 426B, analog-to-digital converter (ADC) circuits 428A and 428B and a multiplexer (MUX) circuit 430 are connected between preamplifiers 412A and 412B and read/write channel 424. Preamplifier 412A is multiplexed to select a single one heads 420A to perform a read/write operation. Similarly, preamplifier 412B is multiplexed to select a single one heads 420B to perform a read/write operation. Further, the selected one of heads 420A alternates with the selected one of heads 420B in performing read/write operations. Thus, if the selected one of heads 420A performs a read/write operation during a first disc revolution, the selected one of heads 420B is inactive during that revolution. However, during a second revolution, the selected one of heads 420B is active in performing the read/write operation and the selected one of heads 420A is inactive. Preamplifiers 412A and 412B provide amplified signals to a read/write channel 424 of electronics 402. Read/write channel 424 performs encoding and decoding of data written to and read from the discs 415.

Electronics 402 further includes a servo processor 432 that receives inputs from servo channels 434A and 434B and responsively provides output signals used for control operations. The servo processor 432 has a first output connected to servo controllers 436A and 436B via first interface 438, and has a second output connected to preamplifiers 412A and 412B via a second interface 440. The servo processor 432 provides intelligent control of actuator assembly 410 through servo controllers 436A and 436B. By commands issued to servo controllers 436A and 436B by servo processor 432, VCMs 411A and 411B move actuator sub-assemblies 410A and 410B, respectively.

One challenge to a drive such as 400 is sustaining control of two VCMs 411A and 411B with a single servo system (e.g., with single servo processor 432). One aspect of operation that relaxes the servo processing in the single servo system of drive 400 is that one actuator at a time is to be positioned well enough to enable reading/writing. Active positioning can alternate between the two actuators 410A and 410B, as per the bulleted sequence below and the accompanying FIG. 5.

Figure 5:
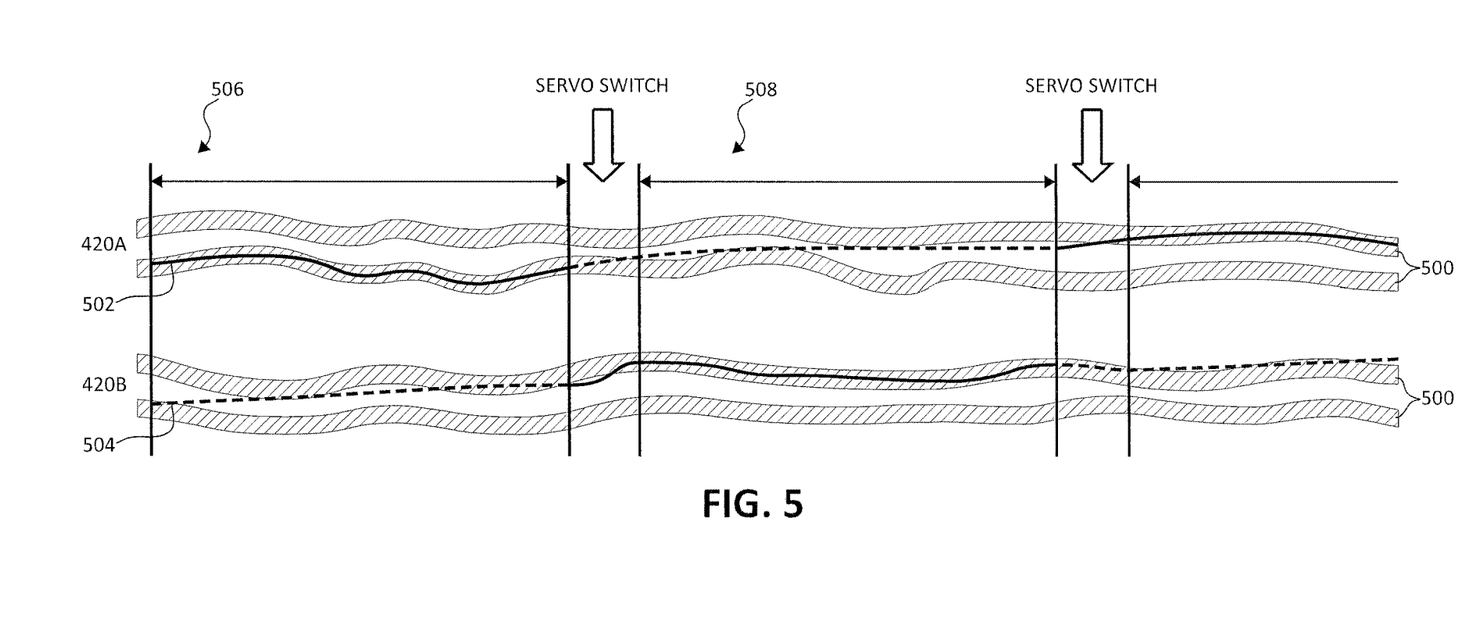
FIG. 5 is a diagrammatic illustration showing servo positioning in a dual-actuator, single-channel drive of FIG. 4.

In FIG. 5, lines 500 represent tracks, line 502 is a position of one of heads 420A and line 504 is a position of one of heads 420B. Solid portions of lines 502 and 504 correspond to when the head 420A, 420B is positioned for track-following within limits for active reading/writing, and the dashed portions of lines 502 and 504 correspond to when the head 420A, 420B is loosely positioned.

- During a first disc revolution 506, head 420A (of actuator 410A) is actively positioned to track center within error limits allowed for reading/writing.
- Also, during the first disc revolution 506, head 420B (of actuator 410B) is loosely positioned to its previous or next track. The tolerance of this "loose" positioning is just to a degree so as not to incur a conspicuous performance penalty when it is time to position head 420B (of actuator 410B) for active reading/writing on a next track.
- At the end of read/write operations with head 420A (of actuator 410A), which may be at the end of the first disc revolution 506, active servo control transitions to head 420B (of actuator 410B), and head 420A (of actuator 410A) is just loosely held to its current or next track position.

At the end of read/writer operations during second disc revolution 508 with head 420B (of actuator 410B)), active servo control transitions back to head 420A (of actuator 410A), and head 420A (of actuator 410A) is loosely held to its current or next track position.

The "loose" control referenced above may involve setting the VCM 411A, 411B drive for a whole revolution to simply counteract bias forces (e.g., windage, pivot cartridge ball bearing friction, and a bias force from a flex circuit connected to the head 420A, 420B). This type of open loop control employs negligible servo processing power. The bias correction for dwelling on a track is essentially just a mean of corrections applied to the VCM 411A, 411B during active control of a neighboring track.

The bias correction may also be made adaptive, by using an error from a desired next-track position at the start of each 1-track seek to adjust the bias current applied during the next loose-control revolution.

In general, when one of the first head or the second head is reading/writing data, the other one of the first head or the second head is loosely managed over the first data storage surface or the second data storage surface. The loose management may also include loose or lazy seeks.

As indicated above, drive 400 is capable operating in a manner that produces results of the type shown in the BW versus LBA profile of FIG. 3. For a drive to operate in a manner that produces results of the type shown in the plots on the right side of FIG. 2, the drive would include two read/write channels 424 and two servo processors 432 (or a single servo processor having a substantially greater processing capability than that of servo processor 432 employed in drive 400).

In addition to the drive-implemented logical space mapping described above, there are other techniques to exploit complementary dual actuators to implement a drive that provides a substantially constant data rate for a host workload. One such technique is to enlist host management to distribute its workload across surfaces served by dual actuators driven to complementary positions.

Figure 6:
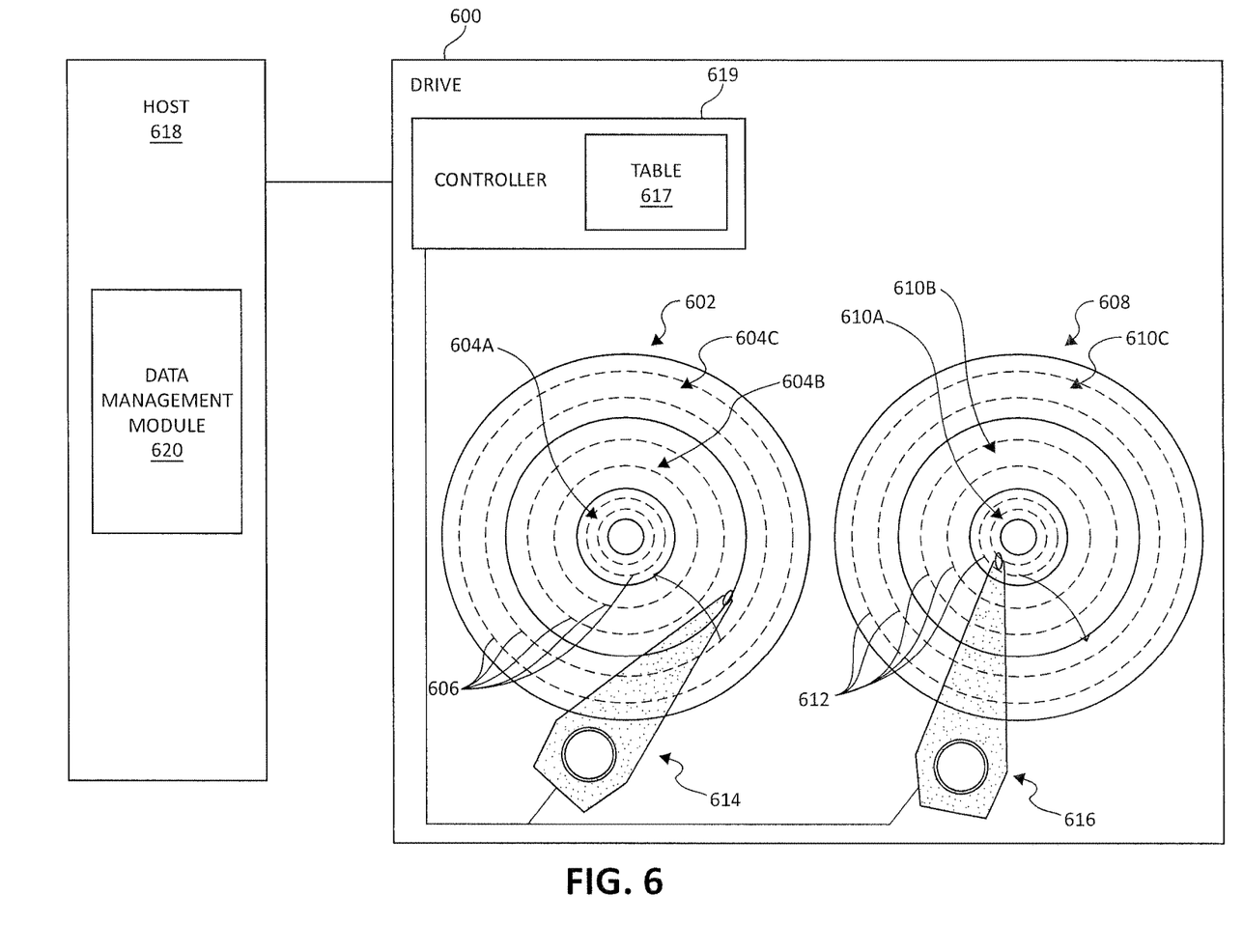
FIG. 6 is a diagrammatic illustration a data storage device that enlists host management to distribute its workload across surfaces served by dual actuators driven to complementary positions in accordance with one embodiment.

FIG. 6 illustrates an example data storage device 600 that enlists host management to distribute its workload across surfaces served by dual actuators driven to complementary positions in accordance with one embodiment. Device 600 includes a first disc surface 602 having an ID zone 604A, a MD zone 604B and an OD zone 604C, with each of zones 604A-604C including a plurality of tracks 606. Drive 600 further includes a second disc surface 608 having an ID zone 610A, a MD zone 610B and an OD zone 610C, with each of zones 610A-610C including a plurality of tracks 612. It should be noted that first and second disc surfaces 602 and 608 are shown as including three zones as an example, but any suitable number of zones may be included in different embodiments. Device 600 is a dual-actuator drive in which a first actuator 614 moves from an OD to an ID of the first disc surface 602 and a second actuator 616 moves from the ID to the OD, and therefore OD and ID zones (or two MD zones) are available at the same time, and the overall drive 600 data rate is close to the combined MD rate.

In the embodiment of FIG. 6, drive 600 provides OD/MD/ID throughput performance at different zones of surfaces 602 and 608 to a host 618 coupled to drive 600. The OD/MD/ID throughput performance at different zones of surfaces 602 and 608 may be stored in a table 617 within a memory of a drive control circuit 619 or in any suitable memory of drive 600. Controller or control circuit 619 is coupled to different components (e.g., actuators 614 and 616) and controls various drive 600 operations. The host 618 manages (by a data management module 620) the allocation of data files or data streams based on the OD/MD/ID throughput at the same time. For example, in a system with 30 cameras feeding data to the drive 600, where the OD/ID data rate ratio is 2:1, with first actuator 614 at the OD (e.g., within zone 604C) and the second actuator 616 at the ID (e.g., with zone 610A), the streams from 20 cameras are directed to the first actuator 614 at the OD, and the streams from the remaining 10 cameras are directed to the second actuator 616 at the ID. Similarly, when both actuators 614 and 616 are near the MD (e.g., within zones 604B and 610B), 15 streams are directed to each of actuators 614 and 616. The net result is a substantially constant data rate made available to the 30 streams.

In some embodiments, data (from, for example, a number of cameras) may be sent intermittently to a data storage device in chunks, packets or granules, and the data storage device may route the chunks or portions of the chunks to different actuators to achieve at least some load balancing.

Figure 7:
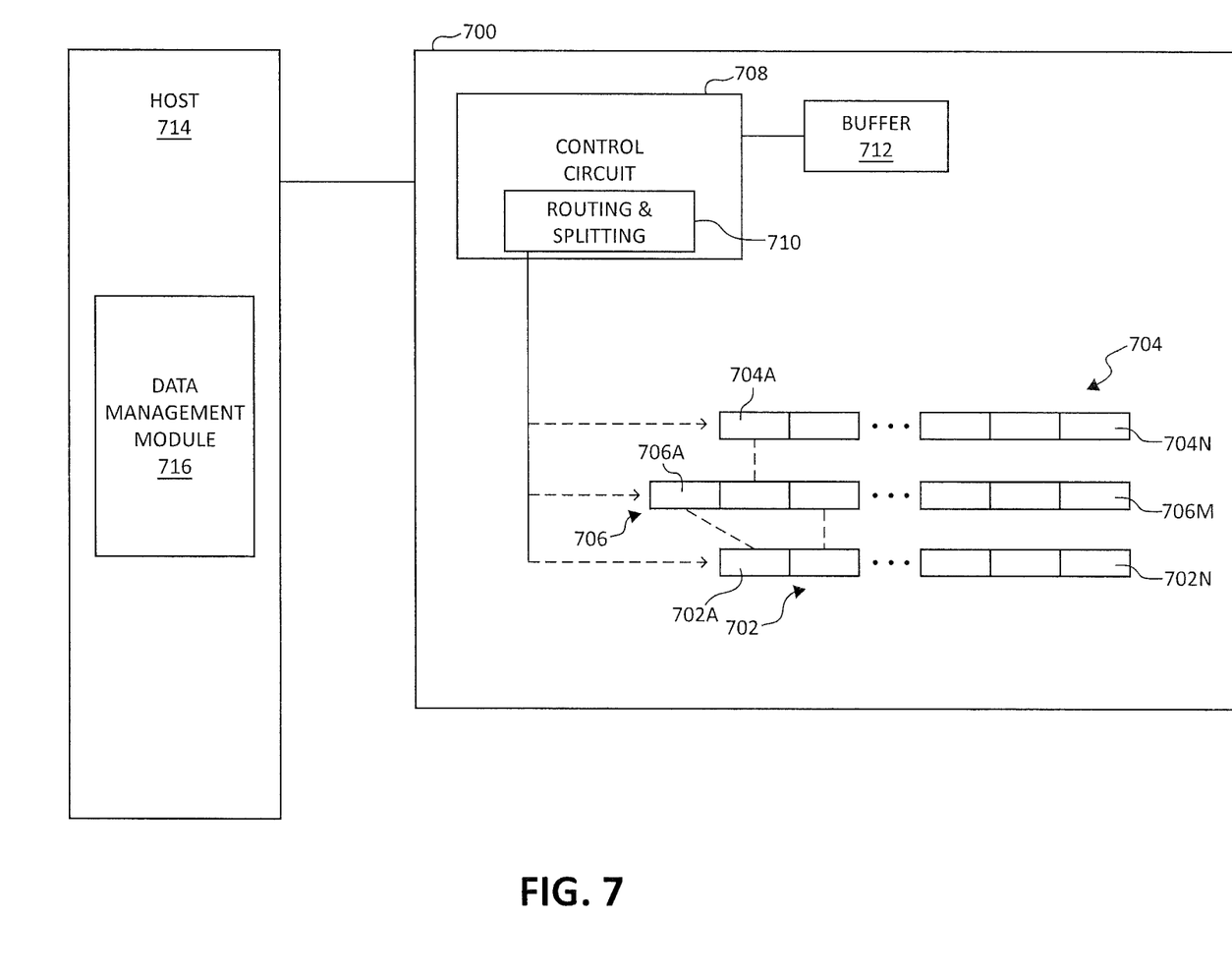
FIG. 7 is a diagrammatic illustration of a system of data storage management in accordance with another embodiment.

FIG. 7 illustrates an example data storage device 700 embodiment that is capable carrying out load balancing. Data storage device 700 includes a first physical space (e.g., a first data storage disc surface) 702 and a second physical space (e.g., a second data storage disc surface) 704. First physical space 702 includes a first plurality of physical elements 702A-702N and second physical space 704 includes a second plurality of physical elements 704A-704N. In some embodiments, each of the first plurality of physical elements 702A-702N and the second plurality of physical elements 704A-704N may include multiple tracks or bands, for example. In some embodiments, all individual ones of physical elements 702A-702N and 704A-704N are of a same size. In other embodiments, different ones of physical elements 702A-702N and 704A-704N may be of different sizes.

Data storage device 700 includes a logical space 706 having logical elements 706A-706M. First successive alternate logical elements of the plurality of logical elements 706A-706M are mapped to successive adjacent physical elements of the first plurality of physical elements 702A-702N. Similarly, second successive alternate logical elements of the plurality of logical elements 706A-706M are mapped to successive adjacent physical elements of the second plurality of physical elements 704A-704N. It should be noted that each of logical elements 706A-706M may be a single LBA, an LBA range or a chunk or granule having any suitable size. In some embodiments, all individual ones of logical elements 706A-706M are of a same size. In other embodiments, different ones of logical elements 706A-706M may be of different sizes.

Data storage device 700 also includes a control circuit 708 that includes a routing and splitting component 710. In the interest of simplification, one or more head-carrying actuators that may be coupled to control circuit 708 and may be used to store data into the first plurality of physical elements 702A-702N and the second plurality of physical elements 704A-704N are not shown. As can be seen in FIG. 7, data storage device 700 may also include one or more buffer memories such as 712. Data from a host 714 received in data storage device 700 may initially be stored in buffer 712 and then substantially concurrently transferred by control circuit 708 to the first plurality of physical elements 702A-702N and the second plurality of physical elements 704A-704N. Data received from host 714 may be structured in terms of variable length files, which can be constituted from one or more fixed-sized logical blocks (such as logical blocks which are addressed using LBAs). Accordingly, data extents that are addressed by a first LBA and a logical block count may be received as requests from host 714 and stored in buffer 712.

Control circuit 708 transfers the data extents from the buffer 712 to the first plurality of physical elements 702A-702N or the second plurality of physical elements 704A-704N. The control circuit 708 may identify different ones of the logical elements 706A-706M based on LBAs associated with the received data extents and accordingly determines, by routing and splitting component 710, whether any extent should be routed to the first plurality of physical elements 702A-702N or the second plurality of physical elements 704A-704N. In some cases, a single extent may extend across multiple (e.g., 2) ones of logical elements 706A-706M. In such a case, the extent may be split into sub-portions by component 710, and at least one of the sub-portions may be routed for storage in the first physical space 702 and another one of the sub-portions may be routed for storage in the second physical space 704.

As in the case of the earlier-described embodiments, both the first physical space 702 and the second physical space 704 may have non-uniform data rates. The mapping of successive alternate logical elements to successive adjacent physical elements in a manner described enables control circuit 708 to substantially concurrently store the first subset of the plurality of data extents into the first physical space 702 at a first data rate and the second subset of the plurality of data extents into the second physical space 704 at a second data rate such that the second data rate complements the first data rate. In a particular example, the first physical space 702 is a first disc surface and the second physical space is a second disc surface 704. In the interest of brevity, a description of complementary data rates in connection with disc surfaces is not repeated.

In some embodiments, host 714 may include a data management module 716 that is configured to manage data sent to storage device 700 such that splitting of extents within data storage device 700 is minimized. Minimization of splitting of extents and workload request granularity are described further below in connection with FIG. 8, which is an alternate embodiment that employs multiple logical spaces.

Figure 8:
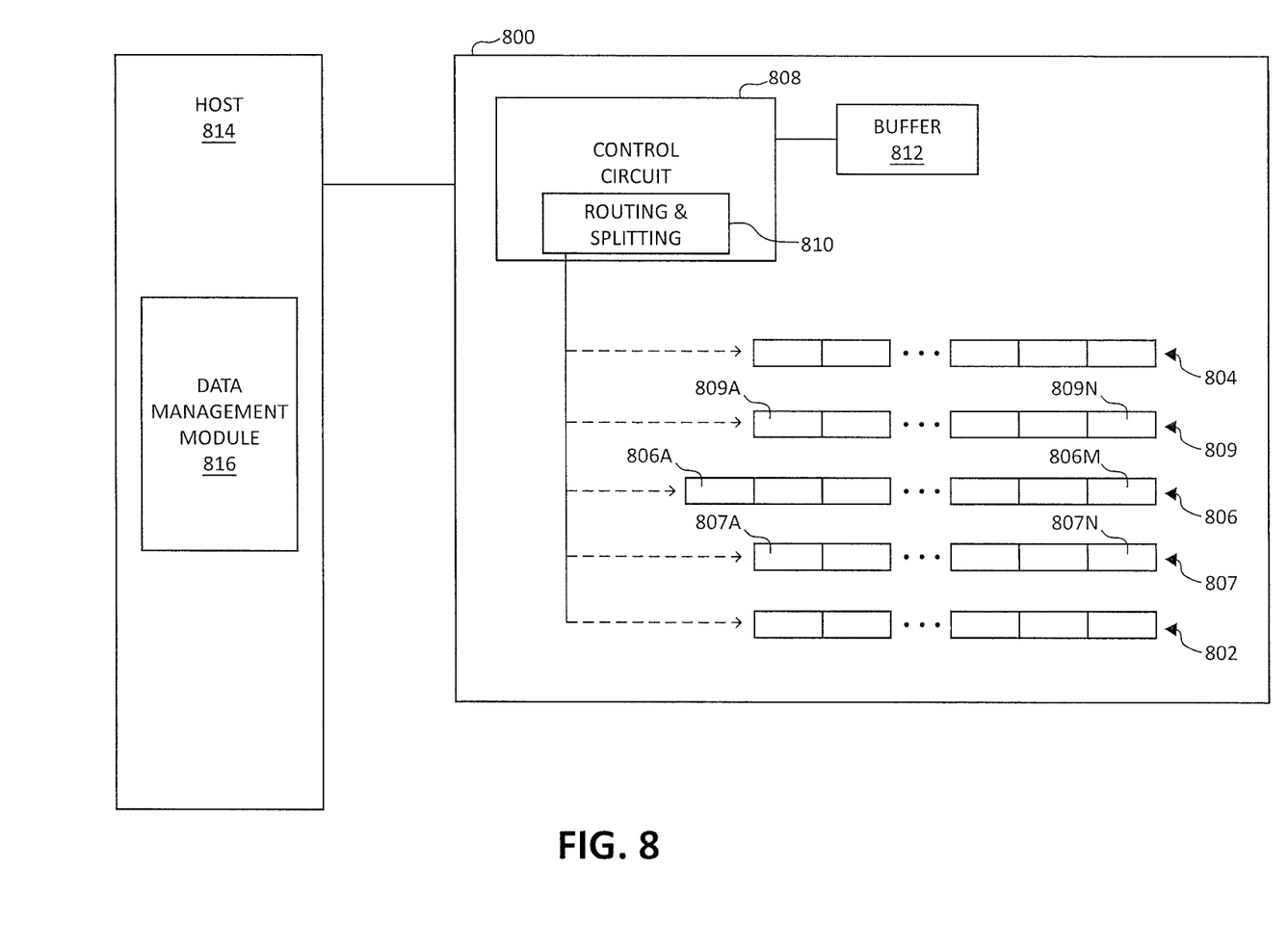
FIG. 8 is a diagrammatic illustration of a system of data storage management in accordance with yet another embodiment.

FIG. 8 illustrates an example data storage device 800 that is capable carrying out load balancing in accordance with another embodiment. In the embodiment of FIG. 8, data storage device 800 includes a first physical space (e.g., a first pool of physical storage elements) 802 and a second physical space (e.g., a second pool of physical storage elements) 804. Device 800 further includes a first logical space 806 having a first plurality of logical elements 806A-806M. First logical space 806 may correspond to a logical space of host 814. Device 800 further includes a second logical space 807 and a third logical space 809. Second logical space 807 includes a second plurality of logical elements 807A-807N and third logical space 809 includes a third plurality of logical elements 809A-809N. In some embodiments, all individual ones of logical elements 806A-806M, 807A-807N and 809A-809N are of a same size. In other embodiments, different ones of logical elements 806A-806M, 807A-807N and 809A-809N may be of different sizes.

In data storage device 800, first successive alternate logical elements of the first plurality of logical elements 806A-806M, are mapped to successive adjacent logical elements of the second plurality of logical elements 807A-807N. Similarly, second successive alternate logical elements of the first plurality of logical elements 806A-806M are mapped to successive adjacent logical elements of the third plurality of logical elements 809A-809N.

Data storage device 800 also includes a control circuit 808 that includes a routing and splitting component 810. In the interest of simplification, one or more head-carrying actuators that may be coupled to control circuit 808 and may be used to store data into the first physical space 802 and the second physical space 804 are not shown. As can be seen in FIG. 8, data storage device 800 may also include one or more buffer memories such as 812. Data from a host 814 may be sent to data storage device 800 and stored in buffer 812 in a manner described above in connection with FIG. 7.

Control circuit 808 transfers the data extents from the buffer 812 to the first physical space 802 or second physical space 804. The control circuit 808 may identify different ones of the logical elements 806A-806M based on LBAs associated with the received data extents and accordingly determines, by routing and splitting component 810, whether any extent should be routed to the first physical space 802 (based on associations between different ones of logical elements 806A-806M and different ones of logical elements 807A-807N) or the second physical space 804 (based on associations between different ones of logical elements 806A-806M and different ones of logical elements 809A-809N). In the embodiment of FIG. 8, control circuit 808 is configured to dynamically assign different ones of a first plurality of physical elements of first physical space 802 to different ones of the second plurality of logical elements 807A-807N, and dynamically assign different ones of a second plurality of physical elements of second physical space 804 to different ones of the third plurality of logical elements 809A-809N. In other respects, the routing and splitting of extents may be carried out in a manner described above in connection with FIG. 7.

Control circuit 808 carries out the dynamic assignment substantially concurrently such that a data rate provided by third logical space 809 with the dynamically assigned different ones of the second plurality of physical elements 804 complements a data rate provided by second logical space 807 with the dynamically assigned different ones of the first plurality of physical elements 802. In other words, updates to the assignments of different ones of the first plurality of physical elements 802 to second logical space 807 are coordinated with updates of the assignments of different ones of the second plurality of physical elements 804 to the third logical space 809 so as to achieve complementary data rates. For example, if a mapping of a logical element (e.g., logical element 807A) in the second logical space 807 to a physical element (e.g., a physical band) in the first physical space 802 is changed from physical element 1 to physical element 9, then a mapping of a corresponding logical element (e.g., logical element 809A) in the third logical space 807 to a physical element in the second physical space 804 is also changed from physical element N−1 to physical element N−9. The assumption in this example is that increasing numbering of the physical elements aligns with a decrease in the data rate as in, for example, a progression from a disc OD to a disc ID.

The above description in connection with FIG. 8 addresses challenges associated with data rates. However, workload servicing may also be challenged by access time. Therefore, a granularity of alternation in the first logical space 806 may be:

1) Large enough so that most requests received in data storage device 800 end up mapping to one of second logical space 807 or third logical space 809.

2) Small enough that, considering a one-or-more sequential write stream workload, requests are not directed to one of second logical space 807 or third logical space 809 for too long a time.

It should be noted that the use of the second logical space 807 and the third logical space 809 allows for caching operations that are possible due to the dynamic assignment of physical locations to logical elements such as 807A-807N and 809A-809N.

The above-described embodiments are in reference to a dual-actuator data storage device. However, the concepts described above are extendable to more than 2 actuators (e.g., 3, 4, etc.).

The above-disclosed subject matter is to be considered illustrative, and not restrictive, and the appended claims are intended to cover all such modifications, enhancements, and other embodiments, which fall within the true scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An apparatus comprising:
   a logical space comprising a plurality of logical elements;
   a first physical space comprising a first plurality of physical elements;
   a second physical space comprising a second plurality of physical elements;
   a map in which:
      first successive alternate logical elements of the plurality of logical elements are mapped to successive adjacent physical elements of the first plurality of physical elements; and
      second successive alternate logical elements of the plurality of logical elements are mapped to successive adjacent physical elements of the second plurality of physical elements; and
   a control circuit configured to employ the map to substantially concurrently manage storage of a plurality of data extents into the first physical space and into the second physical space by routing a first subset of the plurality of data extents into the first physical space, routing a second subset of the plurality of data extents into the second physical space, and splitting individual data extents of a third subset of the plurality of data extents into sub-portions, with at least one of the sub-portions being routed to the first physical space and another one of the sub-portions being routed to the second physical space.

2. The apparatus of claim 1 and wherein both the first physical space and the second physical space have non-uniform data rates, and wherein the mapping of the first successive alternate logical elements of the plurality of logical elements to the successive adjacent physical elements of the first plurality of physical elements, and the mapping of the second successive alternate logical elements of the plurality of logical elements to successive adjacent physical elements of the second plurality of physical elements, enables the control circuit to substantially concurrently store the first subset of the plurality of data extents into the first physical space at a first data rate and the second subset of the plurality of data extents into the second physical space at a second data rate such that the second data rate complements the first data rate.

3. The apparatus of claim 1 and wherein:
   the first physical space comprises a first disc surface having a first inner diameter (ID) and a first outer diameter (OD), and the first plurality of physical elements comprises a first plurality of data tracks or data bands on the first disc surface between the first ID and the first OD; and
   the second physical space comprises a second disc surface having a second ID and a second OD, and the second plurality of physical elements comprises a second plurality of data tracks or data bands on the second disc surface between the second ID and the second OD.

4. The apparatus of claim 3 and wherein:
   the first successive alternate logical elements are mapped in ascending order to successive ones of the first plurality of physical elements beginning substantially at the first OD and ending substantially at the first ID; and
   the second successive alternate logical elements are mapped in ascending order to successive ones of the second plurality of physical elements beginning substantially at the second ID and ending substantially at the second OD.

5. The apparatus of claim 3 and further comprising a dual actuator having a first head that communicates with the first disc surface and a second head that communicates with the second disc surface.

6. The apparatus of claim 5 and wherein the first subset of the plurality of data extents is associated with the first successive alternate logical elements of the first plurality of logical elements, and wherein the second subset of the plurality of data extents is associated with second successive alternate logical elements of the first plurality of logical elements, and wherein the control circuit is configured to transfer the plurality of data extents from a buffer memory to:
   the first disc surface by directing the first head to write the first subset of the plurality of data extents associated with the first successive alternate logical elements into the first plurality of physical elements beginning substantially at the first OD and ending substantially at the first ID; and
   the second disc surface by directing the second head to write the second subset of the plurality of data extents associated with the second successive alternate logical elements into the second plurality of physical elements beginning substantially at the second ID and ending substantially at the second OD.

7. An apparatus comprising:
   a first logical space comprising a first plurality of logical elements;
   a second logical space comprising a second plurality of logical elements;
   a third logical space comprising a third plurality of logical elements;
   a first physical space comprising a first plurality of physical elements;
   a second physical space comprising a second plurality of physical elements;
   a map in which:
      first successive alternate logical elements of the first plurality of logical elements are mapped to successive adjacent logical elements of the second plurality of logical elements; and
      second successive alternate logical elements of the first plurality of logical elements are mapped to successive adjacent logical elements of the third plurality of logical elements; and a control circuit configured to:
dynamically assign different ones of the first plurality of physical elements to different ones of the second plurality of logical elements, and dynamically assign different ones of the second plurality of physical elements to different ones of the third plurality of logical elements; and
employ the map along with the dynamic assignment to substantially concurrently manage storage of a plurality of data extents into the first physical space and into the second physical space.

8. The apparatus of claim 7 and wherein the control circuit is configured to employ the map along with the dynamic assignment to substantially concurrently manage storage of the plurality of data extents into the first physical space and into the second physical space by routing a first subset of the plurality of data extents into the dynamically assigned different ones of the first plurality of physical elements, routing a second subset of the plurality of data extents into the dynamically assign different ones of the second plurality of physical elements, and splitting individual extents of a third subset of the plurality of data extents into sub-portions, with at least one of the sub-portions being routed to the dynamically assigned different ones of the first plurality of physical elements and another one of the sub-portions being routed to the dynamically assigned different ones of the second plurality of physical elements.

9. The apparatus of claim 8 and wherein the first subset of the plurality of data extents is associated with the first successive alternate logical elements of the first plurality of logical elements, and wherein the second subset of the plurality of data extents is associated with second successive alternate logical elements of the first plurality of logical elements.

10. The apparatus of claim 8 and wherein the sub-portion routed to the dynamically assigned different ones of the first plurality of physical elements is associated with the first successive alternate logical elements of the first plurality of logical elements, and wherein the sub-portion routed to the dynamically assigned different ones of the second plurality of physical elements is associated with the second successive alternative logical elements of the first plurality of logical elements.

11. The apparatus of claim 7 and wherein:
the first physical space comprises a first disc surface having a first inner diameter (ID) and a first outer diameter (OD), and the first plurality of physical elements comprises a first plurality of data tracks or data bands on the first disc surface between the first ID and the first OD; and
the second physical space comprises a second disc surface having a second ID and a second OD, and the second plurality of physical elements comprises a second plurality of data tracks or data bands on the second disc surface between the second ID and the second OD.

12. The apparatus of claim 11 and wherein:
different ones of the first plurality of data tracks or data bands are dynamically assigned to different ones of the second plurality of logical elements; and
different ones of the second plurality of data tracks or data bands are dynamically assigned to different ones of the third plurality of logical elements.

13. The apparatus of claim 12 and further comprising a dual actuator having a first head that communicates with the first disc surface and a second head that communicates with the second disc surface.

14. The apparatus of claim 13 and wherein a first subset of the plurality of data extents is associated with the first successive alternate logical elements of the first plurality of logical elements, and wherein a second subset of the plurality of data extents is associated with second successive alternate logical elements of the first plurality of logical elements, and wherein the control circuit is further configured to transfer the plurality of data extents from a buffer memory to:
the first disc surface by directing the first head to write the first subset of the plurality of data extents associated with the first successive alternate logical elements into the dynamically assigned different ones of the first plurality of data tracks or data bands beginning substantially at the first OD and ending substantially at the first ID; and
the second disc surface by directing the second head to write the second subset of the plurality of data extents associated with the second successive alternate logical elements into the dynamically assigned different ones of the second plurality of data tracks or data bands beginning substantially at the second ID and ending substantially at the second OD.

15. The apparatus of claim 7 and wherein the control circuit is configured to carry out the dynamic assignment substantially concurrently such that a data rate provided by the third logical space with the dynamically assigned different ones of the second plurality of physical elements complements a data rate provided by the second logical space with the dynamically assigned different ones of the first plurality of physical elements.

16. A data storage device comprising:
first and second data storage surfaces;
a first actuator comprising a first head that communicates with the first data storage surface and a second actuator comprising a second head that communicates with the second data storage surface; and
a controller, communicatively coupled to the first and second heads, configured to transfer data from a buffer memory to the first and second data storages surfaces by the first and second heads at a substantially constant data rate across a logical block address space of the data storage device,
wherein the first head and the second head alternately perform read/write operations, and wherein, when one of the first head or the second head is reading/writing data, the other one of the first head or the second head is loosely managed over a next read/write location on the first data storage surface or the second data storage surface, such that the other one of the first head or the second head is proximate to the next read/write location, but insufficiently accurately positioned over the next read/write location to carry out a read/operation on the next read/write location.

17. The data storage device of claim 16 and wherein the first head and the second head are coupled to a single read/write channel and the first and second actuators comprise a dual actuator with a common pivot point.

18. The data storage device of claim 16 and wherein the first head is coupled to a first read/write channel and the second head is coupled to a second read/write channel.

19. The data storage device of claim 16 and wherein a first processing power for positioning the first head or the second head for reading/writing the data is greater than a second processing power for loosely managing the other one of the first head or the second head over the next read/write location.

* * * * *